United States Patent
Wu

(10) Patent No.: US 10,250,151 B1
(45) Date of Patent: Apr. 2, 2019

(54) FLYBACK CONVERTER CONTROLLED FROM SECONDARY SIDE

(71) Applicant: Nanjing Greenchip Semiconductor Co., Ltd., Nanjing (CN)

(72) Inventor: Chi-Hao Wu, Nanjing (CN)

(73) Assignee: NANJING GREENCHIP SEMICONDUCTOR CO., LTD., Nanjing (CN)

( * ) Notice: Subject to any disclaimer, the term of this patent is extended or adjusted under 35 U.S.C. 154(b) by 0 days.

(21) Appl. No.: 15/874,311

(22) Filed: Jan. 18, 2018

(30) Foreign Application Priority Data

Dec. 13, 2017 (CN) .......................... 2017 1 1331074

(51) Int. Cl.
*H02M 3/335* (2006.01)
*H02J 7/00* (2006.01)
*H02M 1/44* (2007.01)

(52) U.S. Cl.
CPC ....... *H02M 3/33592* (2013.01); *H02J 7/0052* (2013.01); *H02J 2007/0059* (2013.01); *H02J 2007/0062* (2013.01); *H02M 1/44* (2013.01)

(58) Field of Classification Search
CPC .... H02M 3/33592; H02M 1/44; H02J 7/0052; H02J 2007/0059
See application file for complete search history.

(56) References Cited

U.S. PATENT DOCUMENTS

| | | | | |
|---|---|---|---|---|
| 2014/0098579 | A1* | 4/2014 | Kleinpenning | ... H02M 3/33523 363/21.17 |
| 2014/0268911 | A1* | 9/2014 | Telefus | ............. H02M 3/33523 363/21.08 |

* cited by examiner

*Primary Examiner* — Jue Zhang
(74) *Attorney, Agent, or Firm* — Muncy, Geissler, Olds & Lowe, P.C.

(57) ABSTRACT

A flyback converter with a secondary side control includes a transformer having a primary winding and a secondary winding, a rectifier switching device in the secondary side configured to provide a rectifier path and a switching path, a secondary side control circuit configured to detect the output voltage or current value and to control the states of the rectifier switching device according to the variations between the pre-set voltage or current value and the output voltage or current value, a primary side switching device in the primary side configured to switch between on and off states, an auxiliary winding coupled to the secondary winding for providing power and detecting the states of the secondary side rectifier switching device, and a primary control circuit configured to control the primary side switching device based on the detected output state of the secondary winding from the auxiliary winding.

17 Claims, 3 Drawing Sheets

FLYBACK CONVERTER CONTROLLED FROM SECONDARY SIDE

TECHNICAL FIELD

The present invention relates to a flyback converter, and more particularly, a flyback converter controlled from secondary side.

BACKGROUND

Power converter are widely used to provide required voltages and load currents especially in environments that have higher concentrations of telecommunications or computer equipment. These power converters are often required to provide higher levels of output power for a small physical volume. This requirement dictates that the power converters be high power density devices. These higher power density concentrations also dictate that the power converter operate with as high an efficiency as possible to minimize the converter's heat generation.

Flyback converter is one of the widely used power supply topologies due to its high converting efficiency, low cost, small size and less components. Therefore, the flyback converter has been widely used as a power supply for a variety of electronic devices. In general, a flyback converter is used in the DC-DC conversion for driving a coupled load with transformer-isolated between input and output, an input rectifier circuit can be used in AC-DC application. A conventional flyback converter includes mainly an input circuit, an output circuit, a transformer, and an optical coupler. An input circuit connects to an input voltage and contains mainly two parts, a transistor for switching and a controller for regulating PWM (pulse width modulation). The transistor connects to primary side winding of the transformer at one end, and also connects to the output of the controller at the other end. The input FB end of the controller connects to one end of the optical coupler. At the system's output side, an output circuit connects to a secondary-side winding of the transformer. The output voltage Vout connects in parallel to one end of the optical coupler, isolating the input circuit from the output circuit, and conveying the output voltage back to the controller. Consequently, the controller is able to output a stable voltage by controlling the on-off states of the transformer.

The above-mentioned prior art utilized the feedback control function of an optical coupler to regulate the output voltage. The physical characteristic of an optical coupler unavoidably affects the stability and durability of the system. For example, the coupling efficiency of an optical coupler reflects the accuracy of an output voltage. In further, extra electric components are required to reduce the un-stability of the system, thus adding extra cost and requiring more space.

To solve the above issues, a self-excited flyback converter disclosed in U.S. Pat. No. 7,835,163, as illustrated in FIG. 1A, was proposed. The flyback converter converts an input voltage Vin to an output voltage Vout. It utilized a controller 21 for secondary side regulation at a secondary side of a transformer 11 to control a switching device 13 at a primary side of the transformer 11, to achieve a better regulation.

As illustrated in FIG. 1A, the flyback converter includes an input circuit 1, a transformer 11, and an output circuit 2. The input circuit 1 includes one or more than one switching devices 13, an input end and an output end; the input end of the input circuit 1 connects to an input voltage Vin, the output end of the input circuit 1 connects to a transformer 11. The transformer 11 contains a primary winding and a secondary winding, the primary winding connects to a switching device 13, which regulates the on-off states of the switching device 13 according to the output voltage Vout variation of the secondary winding. Referring to FIG. 1A, a circuit configuration between a first control terminal CTL1 and the second control terminal CTL2 in the controller 21 may be configured as one of a resistor load connection, a short circuit and an open circuit. When the output voltage Vout is higher than a target voltage, the controller 21 is operable to set the circuit configuration to the resistor connection for a period of time so as to stop the switching device 13 from being conducted. Therefore, the self-excited conversion from the input voltage Vin to the output voltage Vout stops, such that the output voltage Vout is prevented from rising. When the output voltage Vout is lower than a target voltage, the controller 21 is operable to set the circuit configuration to the short circuit for a period of time to enable the switching device 13 to conduct. Therefore, the self-excited conversion starts for raising the output voltage Vout. Otherwise, the controller 21 is operable to set the circuit configuration to the open circuit so as to avoid interfering with the operation of the conventional switching power converting apparatus.

The following are some of the drawbacks of the conventional switching power converting apparatus:

(1). It is hard for a designer to determine a resistance value between the first control terminal CTL1 and the second control terminal CTL2 of the controller 21 which has the circuit configuration been the resistor load connection.

(2). The resistance value between the first control terminal CTL1 and the second control terminal CTL2 of the controller 21 may vary during fabrication process of the controller 21, and may drift along with temperature variation, etc.

As illustrated in FIG. 1A, the energy input from the input circuit 1 has been converted into a output voltage Vout of the output terminal of the output circuit 2 through the transformer 11. The output circuit 2 further includes a controller 21 for detecting variation in voltages between output voltage (Vout) and a predetermined voltage, and send back the detected voltage variation to the primary winding as a decision-making feedback the voltage variations. The primary winding then reacts to voltage variations by controlling the on/off states of switching device in PWM to stabilize the output voltages.

In the past decade, the power consumption in portable electronic devices, such as smart phones or tablet PCs, has largely increased as these devices have increasing size of screen and high performance CPUs. Therefore, the batteries installed in these portable devices have increased storage capacity, more electric power is needed for charging these batteries to accommodate the increased power demands. Conventionally, in these portable products, the Universal Serial Bus (USB) port is often used both as communication port and as a power delivery port to accommodate battery charging. A standard USB 2.0 compliant port may provide a maximum power delivery of 7.5 W (5V at 1.5 A) to recharge the battery of the portable devices. However, this limitation restricts the power converting capability and prolongs the charging time. By increasing the charging voltage, even the charging current is still limited, more power can be transferred to the battery of electronic device and faster charging time can be achieved. As a result, several rapid charge protocols have been proposed and available in the market, to enable a rapid charge mode, it is conventional to use higher output voltages over the USB cable, for example rather than use the default USB output 5V, rapid charging modes have been developed that use higher voltage (7-12 V).

Please referred to FIG. 1B, an AC-DC power supply for rapid charge application with flyback converter circuit topology is illustrated, input circuit on the primary wing includes a transistor switching device 101 connected to the primary winding 103 and a primary side controller 105, the primary controller 105 operates in quasi-resonant mode to provide high efficiency. On the secondary output circuit side, a MOSFET switching device 109 connected to a secondary winding 107 replaces the conventional rectified diode for allowing the current flow to a load, a voltage crossed MOSFET switching device 109 can be monitored by a synchronized rectifier controller 111 to decide when to activate the MOSFET switching device 109, and another secondary side controller 113 is used as a USB power delivery interface for delivering power and handling the communication between a power adapter and portable devices. The secondary side controller 113 used as a USB power delivery interface utilizes one optocoupler 115 for isolating the input circuit and output circuit and sends output voltage signals back to the primary side controller 105.

In summary, the flyback converters mentioned above, each of them has different characteristics, however there still some drawbacks exist for further improvement. For example, the coupling efficiency of an optical coupler reflects the accuracy of an output voltage, extra electric components are required to reduce the un-stability of the system; utilizing a controller on the secondary side to control a switching device on the primary side may cause additional difficulties in the control IC fabrication process for this design involving that a current loop during operation will flow through the interior of the secondary controller.

In order to solve the above mentioned issues, a novel flyback converter with secondary side control is proposed.

SUMMARY OF THE INVENTION

In this invention, a flyback converter with a secondary side control is proposed.

A flyback converter with a secondary side control includes a transformer having a primary winding and a secondary winding, a rectifier switching device connected in series to the secondary winding and an output capacitor for providing a rectifier path and a switching path, a secondary side control circuit configured to detect the output voltage or current value and to control the states of the rectifier switching device according to the variations between the pre-set voltage or current value and the output voltage or current value, a primary side switching device connected to one end of the primary winding for switching between on and off states, an auxiliary winding coupled to the secondary winding and configured to provide power and to detect the states of the secondary side rectifier switching device, and a primary control circuit configured to control the primary side switching device based on the detected output state of the secondary winding from the auxiliary winding.

The secondary control circuit further includes an USB port for supporting fast charging.

The polarity of the auxiliary winding is opposite to that of the primary winding and is the same as that of the secondary winding.

The secondary side control circuit is further connected to a voltage detection circuit for detecting an output voltage.

The secondary side control circuit is further connected to a current detection circuit for detecting an output current.

The primary side control circuit supports multi-mode for providing different switching modes under various load conditions, which includes a continuous conduction mode operated under heavy load condition, a quasi-resonant mode operated under medium load condition, a green or frequency-skipping mode under light load condition, and a burst mode operated under no load condition.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

A conventional flyback converter is coupled to an optocoupler through an output side of the converter for isolating converter's input circuit and output circuit, and to send output voltage signal of the output circuit back to a primary side controller. The above-mentioned prior art utilized the feedback control function of an optical coupler to regulate the output voltage. The physical characteristic of an optical coupler unavoidably affects the stability and durability of the system. For example, the coupling efficiency of an optical coupler reflects the accuracy of an output voltage. In further, extra electric components are required to reduce the un-stability of the system, thus adding extra cost and requiring more space.

Figure 1A:
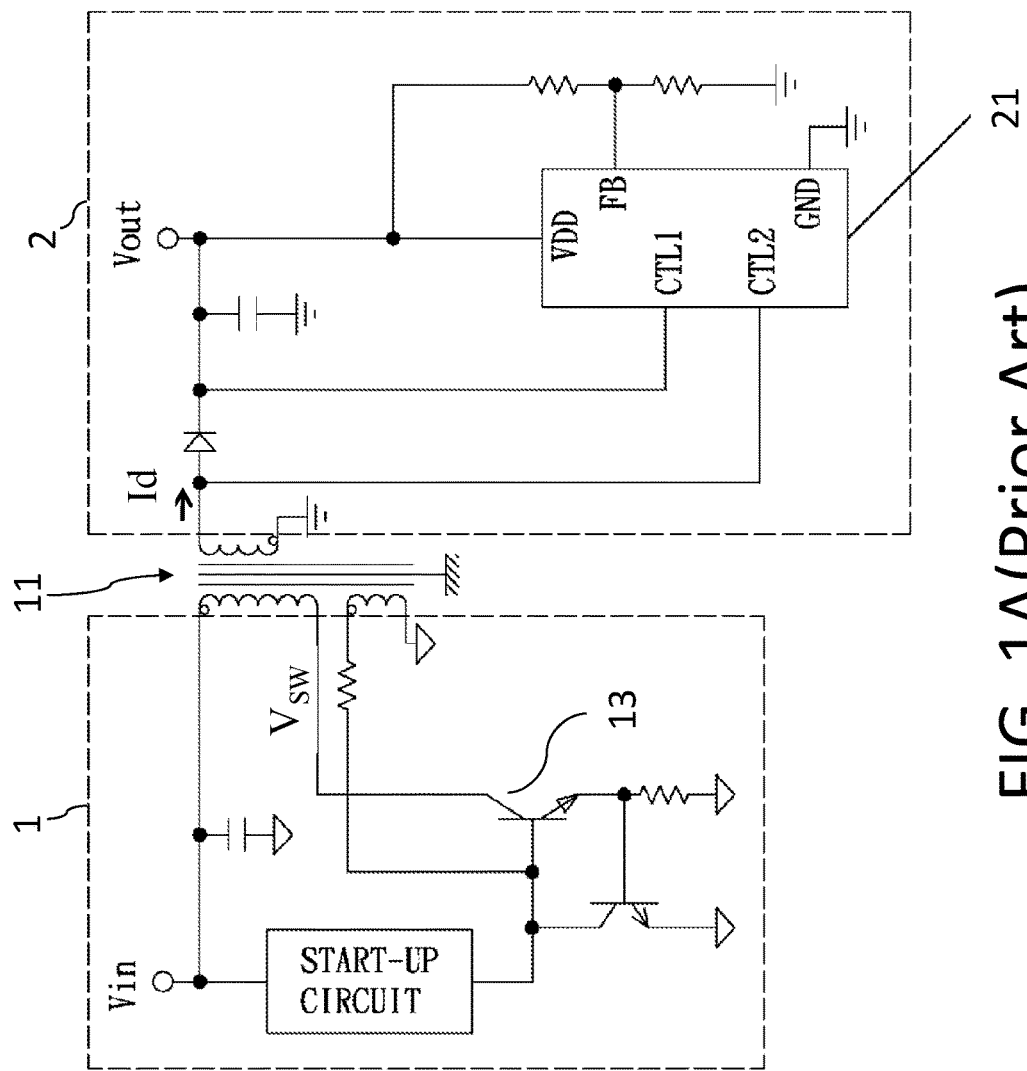
FIG. 1A illustrates a basic circuit diagram of a conventional self-excited flyback converter.
Figure 1B:
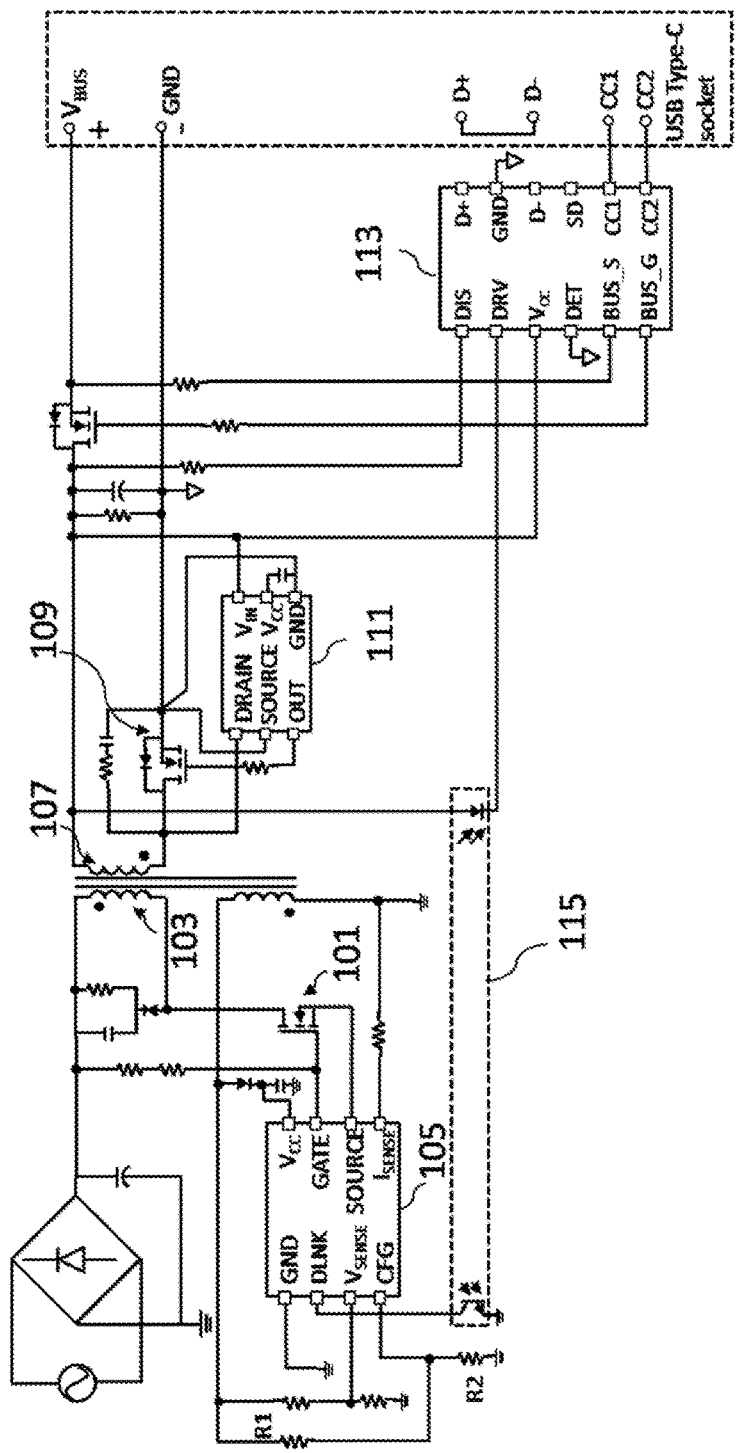
FIG. 1B illustrates a basic circuit diagram of a conventional AC-DC power supply for rapid charge application with flyback converter circuit topology.
Figure 2:
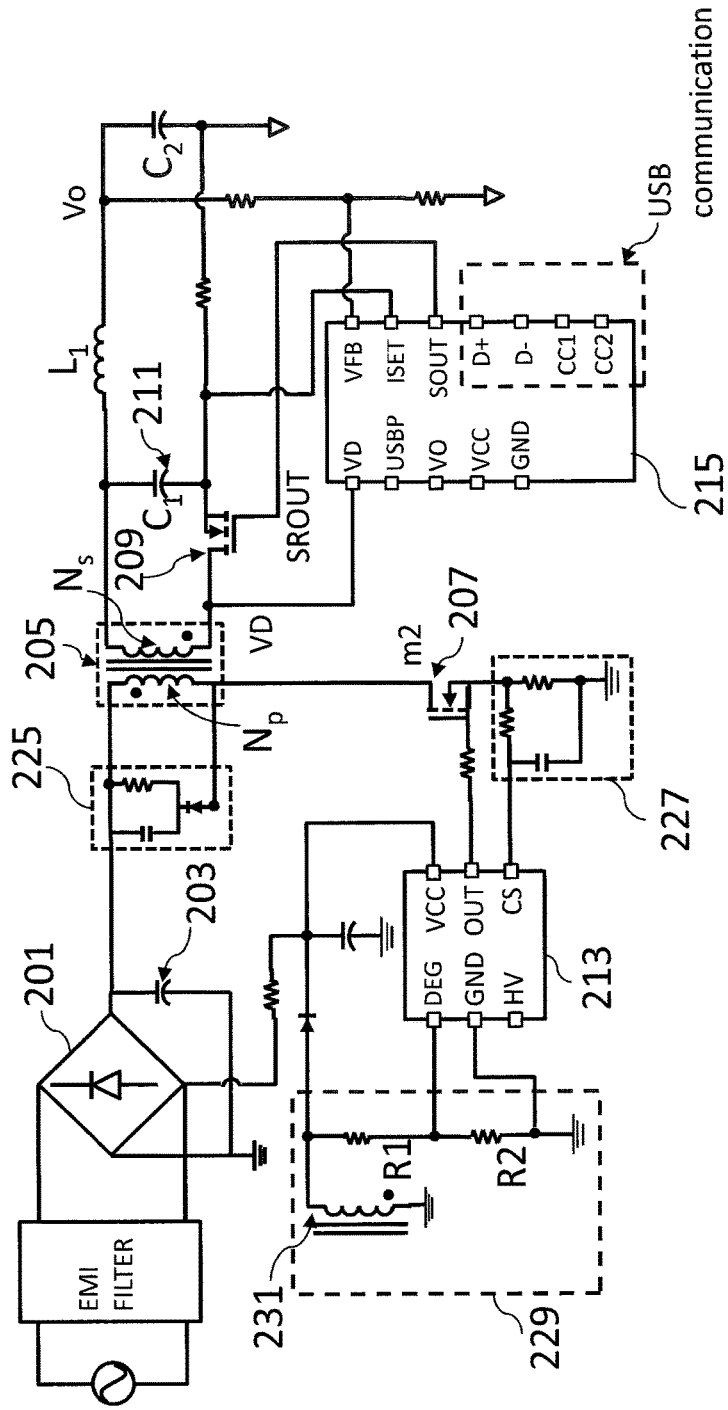
FIG. 2 illustrates a circuit diagram of a flyback converter with a secondary side control according to present invention.

In view of this, a flyback converter with a secondary side control is proposed in the present invention, the optocoupler loop in the conventional flyback converter can be removed. FIG. 2 indicates the circuit of the proposed flyback converter with a secondary side control according the present invention. A household AC power inputs an input voltage through a bridge rectifier 201 and a capacitor 203 for rectifying and filtering the AC voltage into a DC voltage, then feeds the DC voltage into the input of the transformer 205. A primary winding $N_p$ and a secondary winding $N_s$ are coupled through a transformer, the polarity of the primary winding Np is opposite to the polarity of the secondary winding. Flyback converter has a power stage including a switching transistor 207, a rectifier switching transistor 209, which replaces a rectifier diode, as a rectifier switching device, a transformer 205, and a output capacitor 211. By controlling the ON or OFF state of the switching transistor 207 via a primary side control circuit 213, a DC voltage Vo can be output through the coupled rectifier switching transistor 209 and capacitor 211 on the secondary side circuit. The coupled rectifier switching transistor 209 is controlled by a secondary side control circuit 215. In one preferred embodiment, both the switching transistor 207 and the rectifier switching transistor 209 can be a MOSFET respectively. An LC circuit ($L_1$, $C_1$, $C_2$) that stores and filters DC output voltage (Vo) and a RCD snubber circuit 225 connected across the primary winding $N_p$. An auxiliary winding 231 with one end connects to ground and the other end connects to a diode in series then connects to VCC pin of the primary side control circuit 213 for providing power to operate the primary side control circuit 213. The auxiliary winding 231 is coupled to the secondary winding $N_s$ through the transformer 205, which has the same polarity as that of the secondary winding $N_s$, it combines with the voltage divider circuit (R1, R2) to connect to the DEG pin of the primary side control circuit 213 for detecting input/output states of the primary side control circuit 213, providing over voltage protection (OVP), and determining an operation mode to control the primary side switching transistor 207.

A current sense detection circuit 227 connects to source of the primary side switching MOSFET transistor 207 and CS pin of the primary side control circuit 213 for detecting current flowing through the MOSFET transistor 207.

The flyback converter with secondary side control provided in the present invention, on the secondary side, a rectifier switching transistor 209 replaces a rectifier diode and is coupled to a output capacitor 211 for forming a rectifier output circuit, the rectifier switching transistor 209 is controlled by a secondary side control circuit 215. The flyback converter with secondary side control provided in the present invention, which provides output voltage regulation and supports USB fast charging through the D+, D−, CC1 and CC2 pins of the secondary side control circuit 215 enabling that the flyback converter can charge an electronic device with higher charging voltage (7-12V) by an USB line with USB type-C rapid charging function. The operation principle will describe as follows.

A rectifier switching transistor 209 on the secondary side as illustrated in FIG. 2, is controlled by a secondary side control circuit 215. States of the rectifier switching transistor 209, i.e. current flows in positive/negative directions or in OFF state, can be controlled by the secondary side control circuit 215. An output voltage Vo can be detected by a voltage detection circuit, which is a voltage divider circuit connected in parallel to an capacitor $C_2$, connected to VFB pin of the secondary side control circuit 215. Similarly, an output current Io can be detected by a current detection circuit, which is a resistor connected in series to the capacitor $C_2$ and ISET pin of the secondary side control circuit 215.

As the output voltage Vo or current Io of the coupled rectifier output circuit is lower than a pre-set voltage or current value, SROUT pin of secondary side control circuit 215 will be set at high voltage level. Therefore, after the rectifier switching transistor 209 being turned-on, the secondary winding $N_s$ will charge the output, set the auxiliary winding 231 being at high voltage level, instruct the primary side control circuit 213 to turn on the primary side switching transistor 207 through a received signal from a voltage detection circuit 229 connected to DEG pin of the primary side control circuit 213, and enable the output voltage Vo or current Io to the pre-set value. The auxiliary winding 231 is coupled to the secondary winding $N_s$ through the transformer and has the same polarity as that of the secondary winding $N_s$. As the output voltage Vo or current Io of the coupled rectifier output circuit is higher than a pre-set voltage value or current value, the secondary side control circuit 215 will enable the rectifier switching transistor 209 being in a negative current state (i.e. change current direction) to reduce the output impedance, i.e. to transfer energy from output capacitor $C_1$ to the secondary winding coil, and the output Vo or Io will back to its pre-set value. At other time, the secondary side control circuit 215 will set the rectifier switching transistor 209 being in off state (open circuit) to avoid interfering the operation of the switching power supply system.

In addition, the primary side control circuit 213 provided in the present invention can support multi-mode control operation, which can provide switching between different control modes in various load conditions to optimize power converting efficiency. For example, it can operate: in a continuous conduction mode (CCM) under heavy load condition; in quasi-resonant (QR) mode under medium load condition, in green or frequency-skipping mode under light load to provide frequency reducing; in burst mode under no load condition.

The present invention has the features and advantages:

(1) the flyback converter with a secondary side control provides a rectifier MOSFET to replace the rectifier diode on the secondary side circuit, current loop during operation will not pass through the interior the of secondary side control circuit, therefore simplifying system's circuit design;

(2) the optical coupler device for feedback control can be removed from the flyback converter circuit and the power supply can be cost down;

(3) the flyback converter with a secondary side control supports USB rapid charging, after setting voltage and current values of the rapid charging through the secondary side control it provides precise control;

(4) the primary side control circuit of the flyback converter supports multi-mode control, which can provide mode switching between different control modes in various load conditions to optimize power converting efficiency.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A flyback converter with secondary side control comprising:
    a transformer having a primary winding and a secondary winding, wherein the primary winding is configured to receive an input voltage, the secondary winding is coupled to the primary winding and connects to a rectifier circuit to generate a DC output voltage;
        wherein the rectifier circuit includes an output capacitor to provide the DC output voltage;
    a rectifier switching device connected in series to the secondary winding and the output capacitor for providing a rectifier path and a switching path;
    a secondary side control circuit configured to detect the DC output voltage or a current passing the rectifier switching device and to control the states of the rectifier switching device according to the variations between a pre-set voltage or a current value and the corresponding detected DC output voltage or the detected current passing the rectifier switching device;

a primary side switching device connected to one end of the primary winding for switching between on and off states;

an auxiliary winding coupled to the secondary winding and configured to provide power and to detect the states of the secondary side rectifier switching device; and a primary side control circuit configured to control the primary side switching device based on the detected output state of the secondary winding from the auxiliary winding, wherein the primary side control circuit supports multi-modes for providing different switching modes under various load conditions including a continuous conduction mode operated under heavy load condition, a quasi-resonant mode operated under medium load condition, a green or frequency-skipping mode under light load condition, and a burst mode operated under no load condition.

2. The flyback converter with secondary side control of claim 1, wherein the secondary control circuit further includes a USB port for supporting fast charging.

3. The flyback converter with secondary side control of claim 1, wherein the polarity of the auxiliary winding is opposite to that of the primary winding and is the same as that of the secondary winding.

4. The flyback converter with secondary side control of claim 1, wherein the secondary side control circuit is further connected to a voltage detection circuit for detecting the DC output voltage.

5. The flyback converter with secondary side control of claim 4, wherein the voltage detection circuit is a voltage divider circuit.

6. The flyback converter with secondary side control of claim 1, wherein the secondary side control circuit is further connected to a current detection circuit for detecting the current passing the rectifier switching device.

7. The flyback converter with secondary side control of claim 1, wherein the rectifier switching device is a MOSFET.

8. The flyback converter with secondary side control of claim 1, wherein the primary side switching device is a MOSFET.

9. A flyback converter with secondary side control comprising:

a transformer having a primary winding and a secondary winding, wherein the primary winding is configured to receive an input voltage, the secondary winding is coupled to the primary winding and connects to a rectifier circuit to generate a DC output voltage;

a rectifier switching device connected in series to the secondary winding and the rectifier circuit for providing a rectifier path and a switching path;

a secondary side control circuit configured to:
    detect the DC output voltage or a current passing the rectifier switching device, and
    control states of the rectifier switching device according to variations between a pre-set voltage or a current value and the corresponding detected DC output voltage or the detected current passing the rectifier switching device;

wherein the secondary control circuit further includes a USB port for supporting fast charging;

a primary side switching device connected to one end of the primary winding for switching between on and off states; and a primary side control circuit configured to:
    receive a transformer signal from an auxiliary winding of the transformer, and
    control the primary side switching device based on a detected output state of the secondary winding from the auxiliary winding.

10. The flyback converter with secondary side control of claim 9, wherein an auxiliary winding is coupled to the secondary winding and is configured to provide power and to detect states of the rectifier switching device.

11. The flyback converter with secondary side control of claim 10, wherein the polarity of the auxiliary winding is opposite to that of the primary winding and is the same as that of the secondary winding.

12. The flyback converter with secondary side control of claim 9, wherein the rectifier circuit includes an output capacitor to provide an output voltage.

13. The flyback converter with secondary side control of claim 9, wherein the secondary side control circuit is further connected to a voltage detection circuit for detecting the DC output voltage.

14. The flyback converter with secondary side control of claim 13, wherein the voltage detection circuit is a voltage divider circuit.

15. The flyback converter with secondary side control of claim 9, wherein the secondary side control circuit is further connected to a current detection circuit for detecting the current passing the rectifier switching device.

16. The flyback converter with secondary side control of claim 9, wherein the primary side control circuit supports multi-modes for providing different switching modes under various load conditions.

17. The flyback converter with secondary side control of claim 9, wherein the rectifier switching device is a MOSFET.

* * * * *